(12) United States Patent
Yamamoto (10) Patent No.: US 6,816,206 B2
(45) Date of Patent: Nov. 9, 2004

(54) POLARIZING ILLUMINATION OPTICAL SYSTEM AND PROJECTION-TYPE DISPLAY DEVICE WHICH USES SAME

(75) Inventor: Chikara Yamamoto, Kodaira (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/608,226

(22) Filed: Jun. 30, 2003

(65) Prior Publication Data

US 2004/0021832 A1 Feb. 5, 2004

(30) Foreign Application Priority Data

Jul. 16, 2002 (JP) ........................................ 2002-206835

(51) Int. Cl.⁷ ...................... G02F 1/1335; G03B 21/14; G03B 21/00; G02B 27/14
(52) U.S. Cl. ..................... 349/5; 349/8; 349/9; 353/20; 353/31; 359/629
(58) Field of Search ............................. 349/5, 8, 9, 18; 353/20, 31; 359/627, 629

(56) References Cited

U.S. PATENT DOCUMENTS

| | | | | |
|---|---|---|---|---|
| 6,123,424 A | * | 9/2000 | Hayashi et al. ................ | 353/20 |
| 6,337,759 B1 | | 1/2002 | Yamamoto | |
| 6,552,760 B1 | * | 4/2003 | Gotoh et al. .................. | 349/56 |
| 6,631,992 B2 | * | 10/2003 | Brennesholtz ................ | 353/20 |
| 2002/0176255 A1 | * | 11/2002 | Yamauchi et al. ........... | 362/299 |
| 2003/0160925 A1 | * | 8/2003 | Okuyama et al. ............ | 349/117 |

FOREIGN PATENT DOCUMENTS

| | | |
|---|---|---|
| JP | 8-304739 | 11/1996 |
| JP | 11-183848 | 7/1999 |

\* cited by examiner

Primary Examiner—Tarifur R. Chowdhury
(74) Attorney, Agent, or Firm—Arnold International; Jon W. Henry; Bruce Y. Arnold (57) ABSTRACT

A polarizing illumination optical system includes a light source with a parabolic reflector with a light emitter at its focal point so that the light source emits substantially collimated light toward a polarization conversion optical system that separates the light into two polarizations, converts the light to a single polarization, and projects the light through an optical integrator that includes two integrating plates so as to provide a more uniform intensity light beam. The polarization conversion optical system satisfies the following condition: 4 f<D<7 f, where f is the focal length of the parabolic reflector, and D is the minimum width of the optical incidence aperture of the polarization conversion optical system. A projection display device uses the polarizing illumination optical system to illuminate modulators, such as LCDs, that provide different color image components that a projection lens projects on a screen to provide a full color image.

12 Claims, 7 Drawing Sheets

POLARIZING ILLUMINATION OPTICAL SYSTEM AND PROJECTION-TYPE DISPLAY DEVICE WHICH USES SAME

BACKGROUND OF THE INVENTION

In recent years, the projector market has been expanding in conjunction with the proliferation of personal computers. Transmissive and reflective liquid crystal display devices are representative of projectors that optically modulate a light beam from a light source in order to produce a light signal for providing a projected image. This type of liquid crystal display device requires that the liquid crystal displays be illuminated with light polarized in a particular direction. This is achieved by using a polarizing beam splitter in the light path from the light source ahead of the liquid crystal displays.

It is also known to use in such liquid crystal display devices light integrators that include two integrator plates in optical series that each includes a two-dimensional array of lenses in order to increase the uniformity of the intensities, in cross-section, of the light beams that illuminate the liquid crystal displays. For example, bright polarizing illumination optical systems using an integrator and a polarizing beam splitter are disclosed in Japanese Laid-Open Patent Applications H08-304739 and H11-183848. The devices described in these publications provide conversion to a polarized light illumination beam by first increasing the uniformity of the cross-sectional intensity of the illuminating light with an integrator plate and then passing the more uniform light beam through a polarizing beam splitter where images of the light source are formed.

The polarizing beam splitter used is a so-called 'comb-type' that includes a plurality of polarization converter elements, one of each corresponds to a lens of an integrator plate. Each element aligns the polarization direction of the light it transmits with a desired polarization direction without greatly reducing the quantity of light it transmits, thereby providing a bright illuminating beam to a liquid crystal display.

However, in the devices of the Japanese patent applications noted above, because the light beams that are emitted from an integrator plate enter into the comb-type polarization converter elements at non-normal angles, the efficiency of the polarization converter elements is reduced. Additionally, with the comb-type elements, as indicated by the term "comb-type," adjacent portions where light is directly transmitted and where light is not directly transmitted define a stripe-shaped structure where some of the light intended to be directly transmitted becomes mixed with the light not intended to be directly transmitted. This results in a reduction in the total amount of light transmitted.

The precision processing required of the fine stripe-shaped polarization converter elements is costly and is subject to manufacturing problems. Additionally, although problems of reduced total light output can be reduced by the use of a decentering system with an integrator plate, this introduces problems of cost and precision processing related to manufacturing a polarizing illumination optical system with such a decentering system.

BRIEF SUMMARY OF THE INVENTION

The present invention relates to a polarizing illumination optical system and a projection display device using same that provides a uniform and bright illumination beam, is of simple construction, and can be manufactured while reducing the costs associated with precision processing during manufacture. More specifically, the present invention relates to an illumination optical system that uses polarized light to illuminate a liquid crystal display panel, or a similar display for displaying images, and a projection display device that magnifies and projects an image from such a display onto a screen. In particular, the present invention relates to a polarizing illumination optical system for a projection display device that avoids light shielding problems associated with prior art polarizing illuminating optical systems that reduce the amount of illuminating light.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention will now be described in terms of two preferred embodiments of the present inventions, including various modifications of the first preferred embodiment, with reference to FIGS. 1–7.

Embodiment 1

Figure 1:
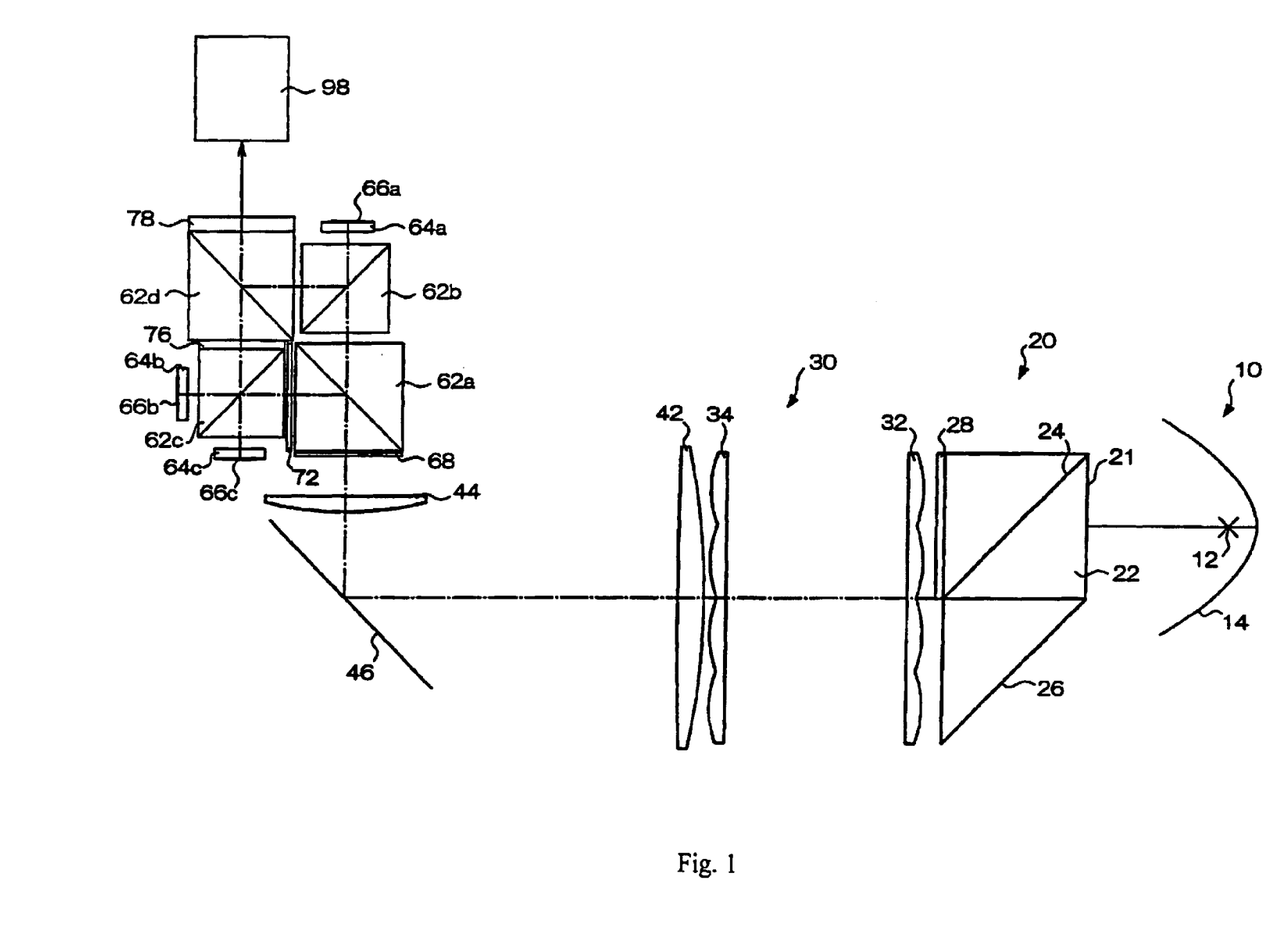
FIG. 1 shows a cross-sectional view of a projection display device according to Embodiment 1.

FIG. 1 shows a cross-sectional view of a projection display device according to Embodiment 1. This projection display device, in addition to converting white light emitted from a light source 10 into a polarized beam, makes the cross-sectional intensity of the light beam more uniform, then performs color separation, followed by synthesizing the colored light beams back together after they have been modulated by image information, and finally projects a desired image onto a screen using a projection lens. As shown in FIG. 1, the polarizing illumination optical system of Embodiment 1 includes the light source 10, a polarization conversion optical system 20 that converts white light into a polarized beam, and an integrator optical system 30 that makes the cross-sectional intensity of the light beam more uniform.

As shown in FIG. 1, the light source 10 includes a light emitter 12 at the focal point of a parabolic reflector 14. The light emitter 12 may be a high luminance white light source, such as an ultra high pressure mercury lamp or a metal halide lamp. The white light emitted by the light emitter 12 is reflected by the parabolic reflector 14 as a substantially collimated light beam with light rays that travel substantially parallel to the optical axis of the parabolic reflector 14 before entering the polarization conversion optical system 20.

The polarization conversion optical system 20 converts the white light emitted from the light source 10 into linearly polarized light. As shown in FIG. 1, after the white light emitted from the light source 10 is separated in a polarizing beam splitter prism 22 at a polarization splitting plane 24 by transmitting a P-polarized beam and reflecting an S-polarized beam, the polarization conversion optical system 20 aligns both polarizations to S-polarization and outputs the beams as a substantially collimated beam. The P-polarized beam is converted to S-polarization by a half-wave plate 28 that operates as a polarization rotation optical element. Thus, the two substantially collimated light beams are input into the integrator optical system 30 without losses that might be associated with filtering out light of one polarization direction.

The polarization conversion optical system 20 is arranged so that the optical axis of the parabolic reflector 14 passes substantially through the center of the optical incidence aperture 21 of the polarization conversion optical system 20. In this manner, the polarization conversion optical system 20 operates with high light efficiency.

The integrator optical system 30 includes a first integrator plate 32 that is a first lens array and a second integrator plate 34 that is a second lens array. Each of the lens arrays includes a plurality of convex lenses arranged in a rectangular array on a substrate. Each of the convex lenses of the first lens array and each of the convex lenses of the second lens array have corresponding opposing planes and are arranged so that the light from the light source is efficiently and uniformly irradiated to the effective opening of the reflective liquid crystal displays (hereinafter referred to as reflective LCDs). The light that enters into the first lens array forms, by the converging action of each convex lens, the same number of light source images as the number of convex lenses within a plane orthogonal to the optical axis. The second lens array is arranged in the vicinity of these light source images. The light collected by each convex lens of the second lens array enters into a condenser lens 42 adjacent the second lens array.

The integrator optical system 30 receives the two substantially collimated light beams from the polarization conversion optical system and produces from these a light beam more uniform in intensity in a cross-section perpendicular to the optical axis. The polarized light beam condensed by the condenser lens 42 is reflected at a right angle by a mirror 46. After being further condensed by a condenser lens 44, the polarized light beam is separated into three optical color components by polarization converter elements 68 and 72, as well as the polarizing beam splitter prisms (hereafter referred to as PBS) 62a and 62c, and the color component light beams are directed to the reflective LCDs 66a, 66b, and 66c that correspond to each color component. The reflected light beams from LCDs 66a, 66b, and 66c are synthesized by the wavelength polarization converter element 76 and PBSs 62b, 62c, and 62d, and after passing through the wavelength polarization converter element 78 that includes a polarizing filter, a single output light beam is transmitted to the projection lens 98 that projects a magnified image onto a screen (not shown). In this manner, images displayed by each reflective LCD 66a, 66b, and 66c are combined as a projected full color image onto the screen.

Each of the polarization converter elements 68 and 72 rotates the direction of polarization of light of a particular color a prescribed amount in order to obtain P-polarized output light. For example, light of a first color is transmitted through the PBSs 62a and 62b and strikes the reflective LCD 66a, which optically modulates the first color light. The second color light is reflected at the interior of the PBS 62a and transmitted through the PBS 62c and strikes the reflective LCD 66b, which optically modulates the second color light. The third color light is reflected interior of each of the PBSs 62a and 62c and strikes the reflective LCD 66c, which optically modulates the third optical color. Additionally, each of the quarter-wave plates 64a-64c is arranged adjacent one of the LCDs 66a-66c, respectively.

A more detailed description of the composition of a polarizing illumination optical system that relates to Embodiment 1 will now be given. As shown in FIG. 1, the polarization conversion optical system 20 includes a half-wave plate that can rotate the polarization direction of a light beam by ninety degrees (e.g., change P-polarized light into S-polarized light), and a polarizing beam splitter prism 22 that has a polarization splitting plane 24. The white light emitted from the light source 10 enters into the polarization conversion optical system 20, which is arranged so that the center axis of the optical incidence aperture 21 of the polarization conversion optical system 20 coincides with the optical axis of the parabolic reflector 14, and is split at the polarization splitting plane 24 into two polarized light beams with the P-polarized light beam being transmitted and the S-polarized light beam being reflected. The S-polarized light beam is emitted from the polarization conversion optical system 20 after it is reflected at the reflective plane 26. Thereby, all the output light from the polarization conversion optical system 20 is directed as S-polarized light toward the integrator optical system 30. Because all the light from the light source 10 that reaches the polarization splitting plane 24 is emitted as a substantially collimated light beam, the polarization conversion efficiency is extremely high. Additionally, because this polarization conversion optical system 20 does not have a light shielding component in the central area of the light beam incidence side as in comb-type polarization conversion optical systems, losses related to the comb-type arrangement do not occur.

The polarization conversion optical system 20 described above satisfies the following Condition (1):

$$4 f < D < 7 f \qquad \text{Condition (1)}$$

where f is the focal length of the parabolic reflector 14, and

D is the minimum width of the optical incidence aperture of the polarization conversion optical system 20.

In the case where the optical incidence aperture is rectangular, the term "minimum" as used in "minimum width" above, refers to the shortest length between the opposing sides of the optical incidence aperture.

The above Condition (1) indicates the range wherein a bright polarization conversion optical system 20 can be obtained. When the value of D falls below the lower limit of the above Condition (1), the brightness of the polarizing illumination optical system is reduced because the amount of light received from the light source 10 is smaller, and when the value of D exceeds the upper limit of the above Condition (1), although the amount of light received from the light source 10 is greater, the loss of light at the integrator plate is larger, resulting in less light being passed through the polarizing illumination optical system. Optimum brightness is obtained when Condition (1) above is satisfied. This will be described in more detail with regard FIGS. 2A through 6B that show variations related to Embodiment 1.

Figure 2A:
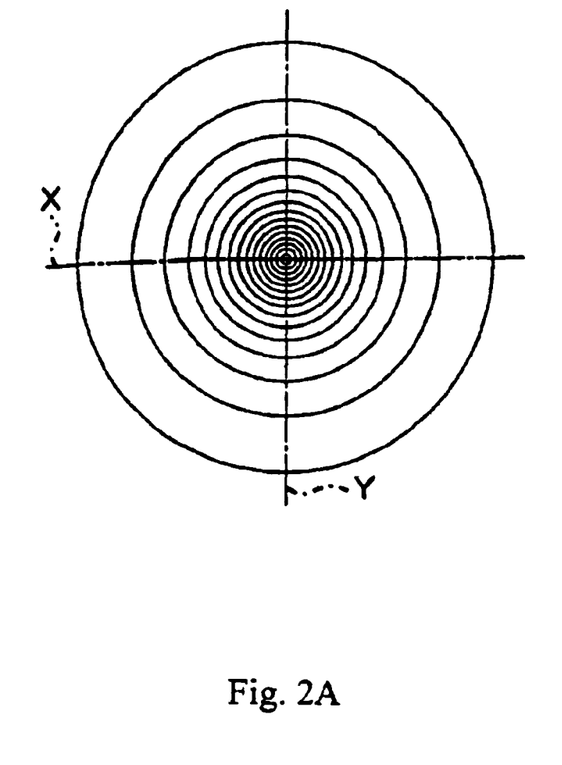
FIG. 2A shows a light intensity contour map in a plane perpendicular to the optical axis of the light source of an illuminating beam from the light source of FIG. 1.
Figure 2B:
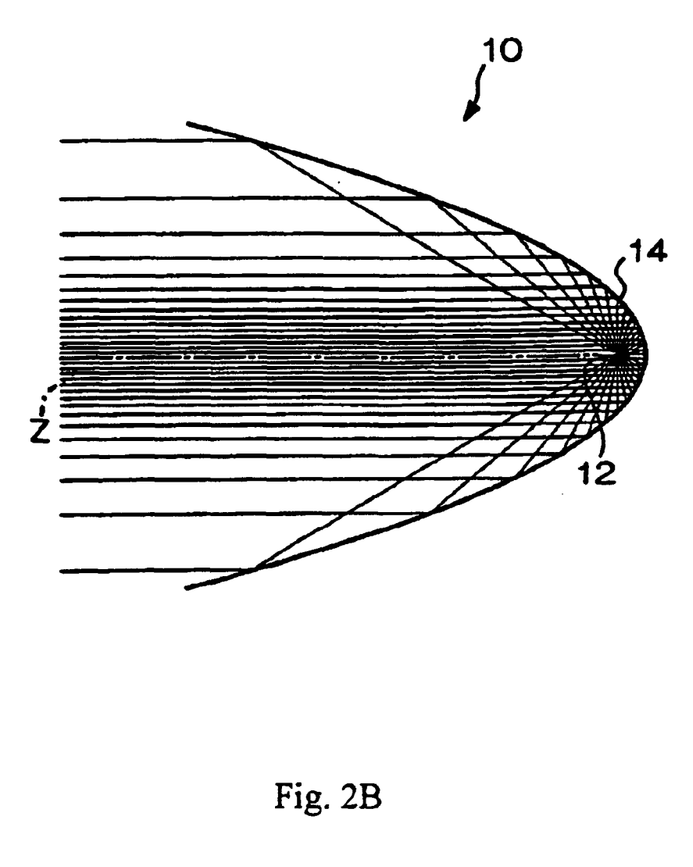
FIG. 2B shows a cross-sectional view of the light source and the light intensity profile of FIG. 1 in a plane perpendicular to that of FIG. 2A and including the optical axis of the light source of FIG. 1.

FIG. 2A shows a light intensity contour map in a plane perpendicular to the optical axis of the light source of an illuminating beam from the light source of FIG. 1. In this figure, and in similar light intensity contour maps hereinafter, the closer the line spacing, the higher the light intensity. FIG. 2B shows a cross-sectional view of the light source and the light intensity profile of FIG. 1 in a plane perpendicular to that of FIG. 2A and including the optical axis of the light source of FIG. 1. Additionally, the reference symbols X, X1, X2, and Y in FIGS. 2A–2B through FIGS. 6A–6B indicate orthogonal axes in the light beam cross-sections and/or in the pupil 50 related to the polarization conversion optical system 20 and light source 10, as shown for example in FIGS. 2A–2B, and the positions of these axes relative to the light beam cross-sections and/or pupil 50.

As shown in FIGS. 2A–2B, the white light emitted from the light source lamp 12 arranged at the focal position of the parabolic reflector 14 is reflected by the parabolic reflector 14 to become a substantially collimated light beam that is substantially parallel to the optical axis (Z axis) of the parabolic reflector 14 as the white light is emitted from the front of the light source 10. As shown by the decreasing density of lines from the optical axis Z, the intensity of the emitted light beam decreases rapidly from near the optical axis toward the periphery.

Figure 3A:
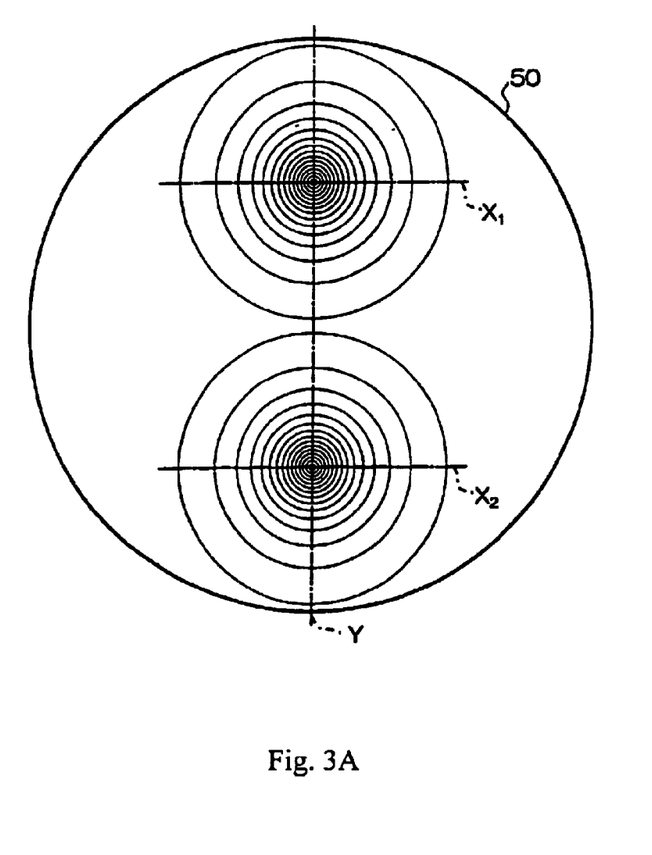
FIG. 3A shows light intensity contour maps in a plane perpendicular to the optical axis of the illuminating beam from an illuminating system of Embodiment 1, similar to that of FIG. 1 but including a polarization conversion optical system, and the pupil of the illuminating system with an optical incidence aperture width equal to 15.7 times the focal length of the light source.
Figure 3B:
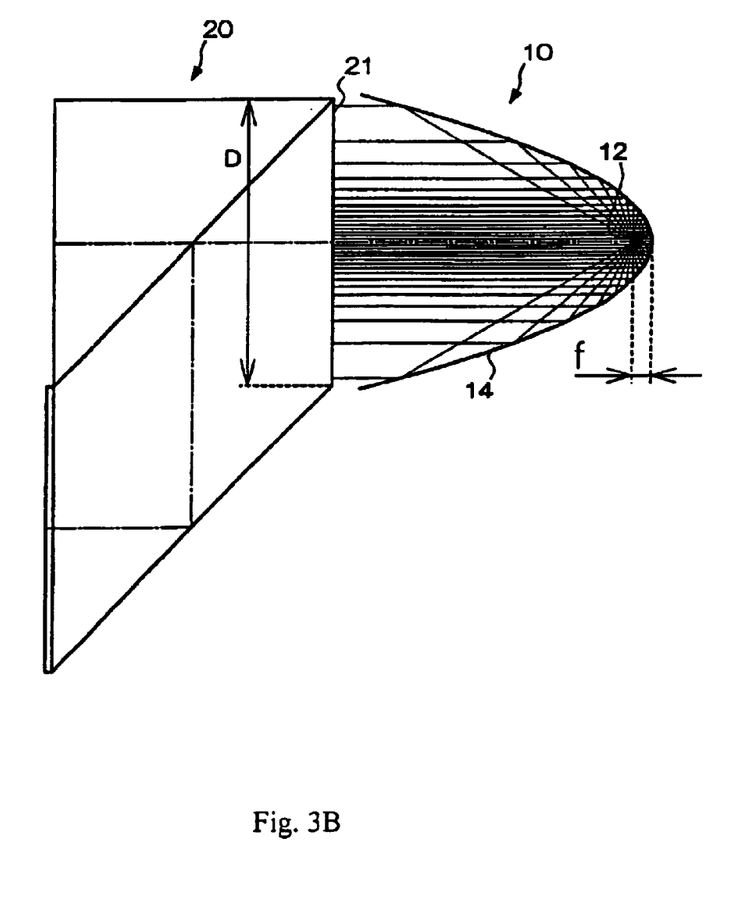
FIG. 3B shows a cross-sectional view of a light source, light intensity profile, and illuminating system of FIG. 3A in a plane perpendicular to that of FIG. 3A and including the optical axis of the light source.
Figure 4A:
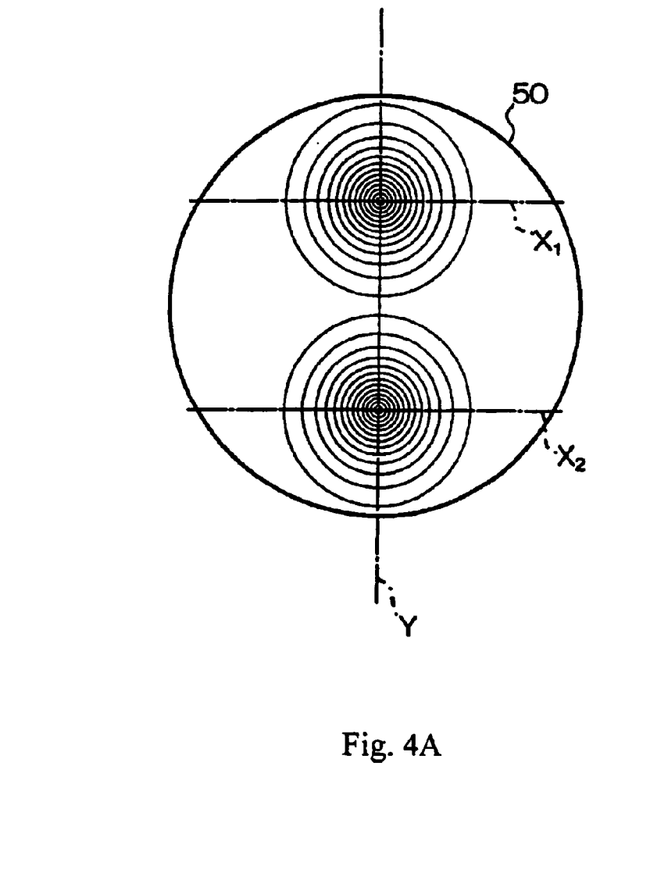
FIG. 4A shows light intensity contour maps in a plane perpendicular to the optical axis of the illuminating beam from an illuminating system of Embodiment 1, similar to that of FIG. 1 but including a polarization conversion optical system, and the pupil of the illuminating system with an optical incidence aperture width equal to 9.4 times the focal length of the light source.
Figure 4B:
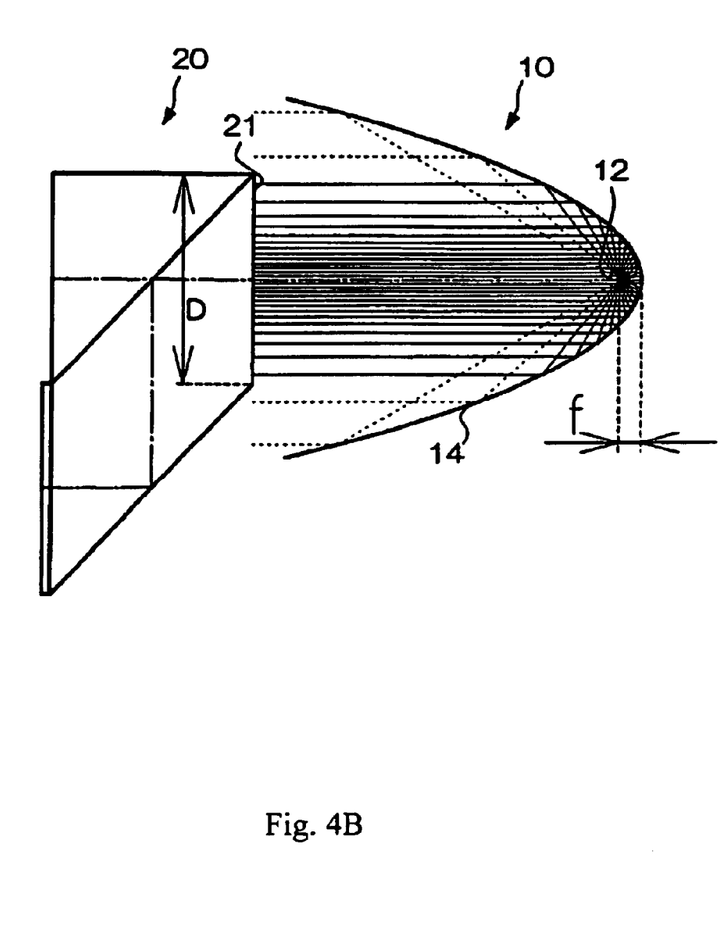
FIG. 4B shows a cross-sectional view of a light source, light intensity profile, and illuminating system of FIG. 4A in a plane perpendicular to that of FIG. 4A and including the optical axis of the light source.
Figure 5A:
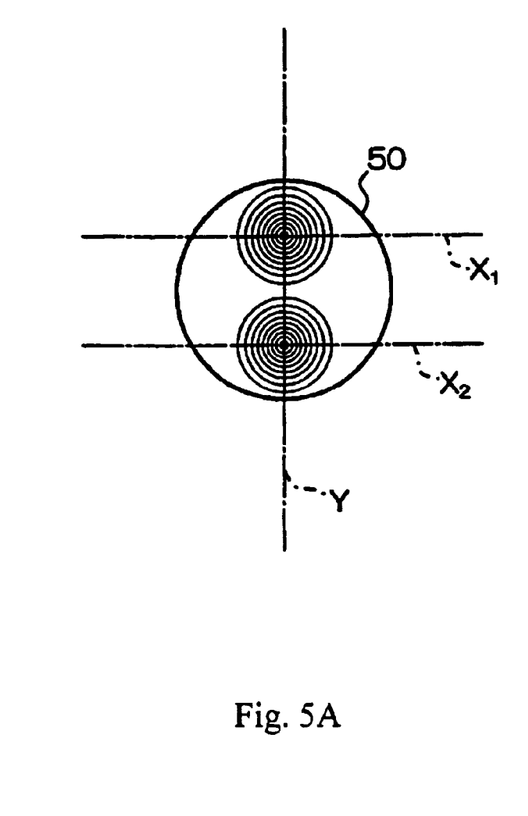
FIG. 5A shows light intensity contour maps in a plane perpendicular to the optical axis of the illuminating beam from an illuminating system of Embodiment 1, similar to that of FIG. 1 but including a polarization conversion optical system, and the pupil of the illuminating system with an optical incidence aperture width equal to 4.6 times the focal length of the light source.
Figure 5B:
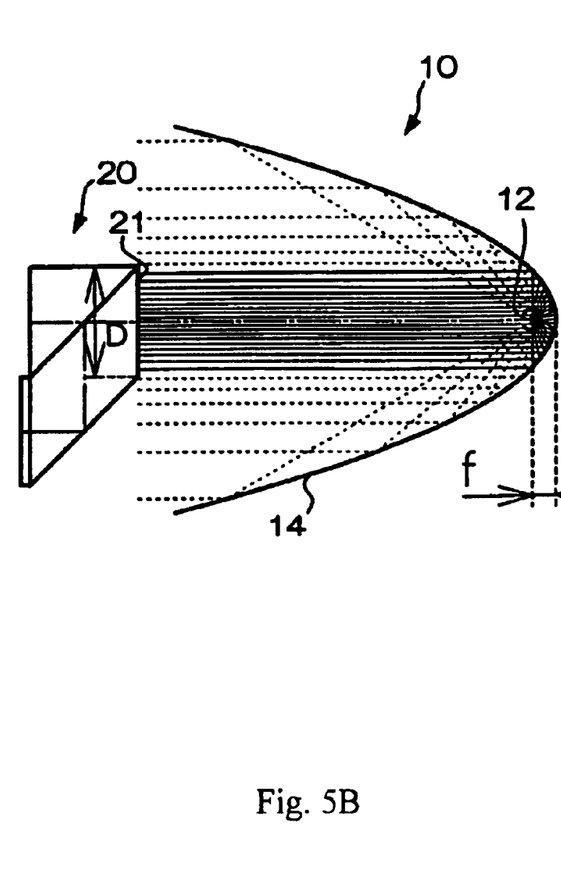
FIG. 5B shows a cross-sectional view of a light source, light intensity profile, and illuminating system of FIG. 5A in a plane perpendicular to that of FIG. 5A and including the optical axis of the light source.

Additionally, when the minimum width D of the optical incidence aperture in the polarization conversion optical system 20 changes as shown in FIG. 3B, FIG. 4B, and FIG. 5B, the intensity distribution of the light beam in the incidence pupil 50 of the optical system is as shown in FIG. 3A, FIG. 4A, and FIG. 5A, respectively. When the upper limit of Condition (1) is exceeded, the diameter of the pupil 50 becomes too large and provides light source images on the integrator plate 34 that are so large that the efficiency of light processing by integrator plate 34 is reduced. This occurs, for example, when the minimum width D of the optical incidence aperture of the polarization conversion optical system 20 equals 15.7·f (as shown in FIG. 3B), and when it equals 9.4·f (as shown in FIG. 4B).

In contrast, when Condition (1) is satisfied, as when the minimum width D of the optical incidence aperture of the polarization conversion optical system 20 equals 4.6·f, as shown in FIG. 5B, the light source image on the integrator plate 34 is small enough that the light is processed efficiently. Also, because the light intensity of the emitted light beam from the light source 10 is extremely large near the optical axis, as shown in FIG. 5B, the light beam enters efficiently into the optical incidence aperture 21 of the polarization conversion optical system 20 from the light source 10.

In other words, with a fixed F-number for the illumination optical system, because the size of the light source images processed at the integrator plate 34 becomes large in relation to the size of each lens element of the integrator plate 34, when the area of the integrator plate 34 becomes too large, a portion of the light beam cannot be used, thereby reducing the illumination efficiency. However, on the other hand, when the integrator plate 34 is too small, a large amount of light from the light source 10 is not able to be processed by the integrator plate. The present invention resolves these problems.

Figure 6A:
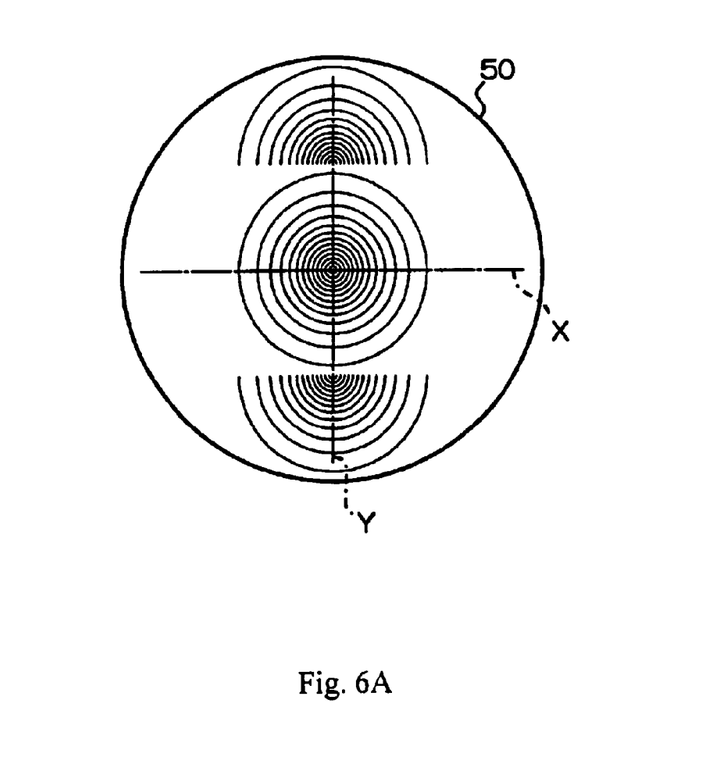
FIG. 6A shows light intensity contour maps in a plane perpendicular to the optical axis of the illuminating beam from an illuminating system that is structurally modified from those of FIGS. 2A–5B and the pupil of the illuminating system.
Figure 6B:
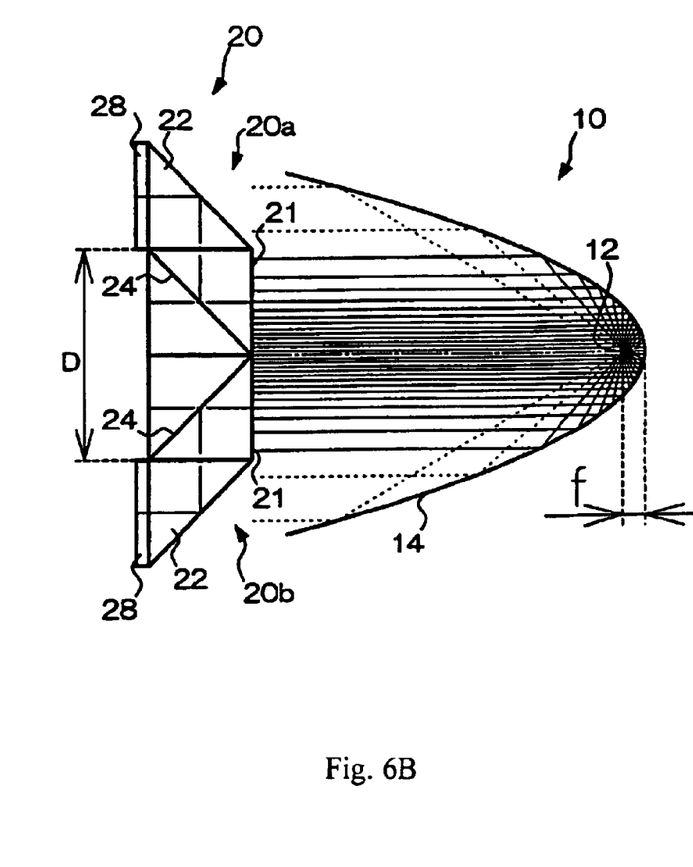
FIG. 6B shows a cross-sectional view of a light source, light intensity profile, and illuminating system of FIG. 6A in a plane perpendicular to that of FIG. 6A and including the optical axis of the light source.

FIG. 6A shows light intensity contour maps within a pupil of an illuminating system that is structurally modified from those of FIGS. 1–5B and in a plane that is perpendicular to the optical axis of the illuminating beam from the illuminating system. FIG. 6B shows a cross-sectional view of the light source, the light intensity, and the illuminating system of FIG. 6A in a plane perpendicular to that of FIG. 6A and including the optical axis of the light source. As shown in FIG. 6B, the illuminating system includes a polarization conversion optical system 20 that includes two polarization conversion optical elements 20a and 20b that are the same size and symmetrically arranged about the optical axis and are joined at the optical incidence aperture 21, two polarizing beam splitter prisms 22 with polarization splitting planes 24, and two half-wave plates 28. In this manner, even when using the two polarization conversion optical elements 20a and 20b in the polarization conversion optical system 20, a bright polarizing illumination optical system is possible by a construction that satisfies Condition (1). Moreover, in this case, the minimum width D of the optical incidence aperture in the polarization conversion optical system is the sum of the minimum optical incidence aperture widths 21, 21 of the polarization conversion optical elements 20a and 20b.

Even with the polarization conversion optical system 20 that uses these two polarization conversion optical elements 20a and 20b, a bright polarizing illumination optical system can be achieved in the same manner as a polarization conversion optical system 20 that includes only one polarization conversion optical element as described above, and compared to the polarization conversion optical system 20 that includes only one polarization conversion optical element, the thickness of the polarization conversion optical system in the optical axis direction can be reduced.

Embodiment 2

Figure 7:
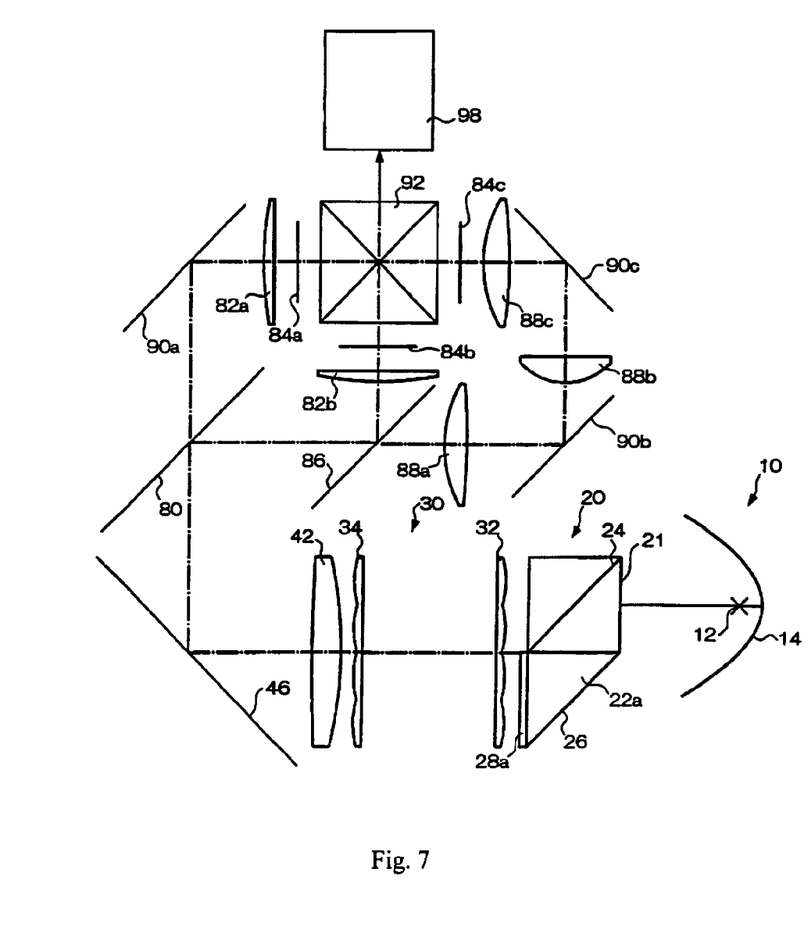
FIG. 7 shows a cross-sectional view of a projection display device according to Embodiment 2.

FIG. 7 shows a cross-sectional view of a projection display device according to Embodiment 2. Unlike Embodiment 1 that uses reflective liquid crystal displays, Embodiment 2 uses transmissive liquid crystal displays. The same reference numerals are given to the components that are unchanged from Embodiment 1 and their descriptions are not repeated.

As shown in FIG. 7, the projection-type display device includes a light source 10 that includes a light emitter 12 emitting white light and a parabolic reflector 14, a polarization conversion optical system 20 that converts white light into uniformly polarized light, and an integrator optical system 30 that makes the cross-sectional intensity of the light beam more uniform. The composition of this polarization conversion optical system 20 of Embodiment 2 differs slightly from the composition of Embodiment 1, as will be described below.

As shown in FIG. 7, the projection-type display device further includes a condenser lens 42 for condensing the output light from the integrator optical system 30, a fully reflecting mirror 46, first and second dichroic mirrors 80 and 86 for splitting the white light condensed by the condenser lens 42 into the three color components of blue, green, and red light. A first transmissive LCD 84a, a second transmissive LCD 84b, and a third transmissive LCD 84c modulate, respectively, each of the color components according to image information from the first dichroic mirror 80 and the second dichroic mirror 86. A three-color synthesizing prism 92, which is an X-shaped dichroic prism, synthesizes the three color components modulated by each of the transmission-type LCDs 84a, 84b and 84c, and a projection lens 98 images the light beam synthesized by the three-color synthesizing prism 92 onto a screen (not shown).

Furthermore, as shown in FIG. 7, a first mirror 90a is provided that reflects a first color component, such as color component B that is separated by being transmitted through a first dichroic mirror 80 to a field lens 82a that substantially collimates the transmitted light. Also, following the field lens 82a, there is provided a first liquid crystal panel 84a where a first color component image is displayed. The first color component light beam is thus modulated with the image information for that color component, is then incident onto the 3-color synthesizing prism 92, and then projected by projection lens 98 onto a screen (not shown). A field lens 82b for converting the second color component (for example component G) into a substantially collimated beam is arranged on the optical axis of the second color component that has been separated from the light reflected by first dichroic mirror 80. The second dichroic mirror 86 separates the second and third component light by reflecting the second color component to the field lens 82b, which transmits the light to the second liquid crystal panel 84b where the image for the second color component is displayed. In addition, along the optical axis of a third optical color component are arranged a second mirror 90b and third mirror 90c for fully reflecting the third color component toward the third liquid crystal panel 84c where the image for the third color component is displayed. Field lenses 88a and 88c are arranged along the optical axis of the third color component for converting third color component into a substantially collimated beam. The third color component is separated from the second and third color components that are reflected from the first dichroic mirror 80 by being transmitted by the second dichroic mirror 86. In this manner the third color component is projected onto the third liquid crystal panel 84c. Additionally, a relay lens 88b is arranged between the second mirror 90b and the third mirror 90c.

As indicated previously, in the projection display device of Embodiment 2, the composition of the polarization conversion optical system 20 differs slightly from that of the projection display device of FIG. 1. In Embodiment 2, as shown in FIG. 7, the polarization conversion optical system 20 includes a polarizing beam splitter prism 22a having a polarization splitting plane 24, and a half-wave plate 28a that converts the S-polarized light beam into a P-polarized light beam. In other words, the white light emitted from the light source 10 enters the polarization conversion optical system 20 and the two polarizations are split with P-polarization light being transmitted and S-polarization light being reflected at the polarization splitting plane 24. Thereafter, the P-polarized light is directly transmitted while the S-polarized light is reflected at the reflecting plane 26 and is transmitted after being converted to P-polarization light by the half-wave plate 28a. In this way, all the light emitted by the polarization conversion optical system 20 toward the integrator optical system 30 is light of P polarization. Thus, Embodiment 2 is the opposite of Embodiment 1 in that all the light emitted by the polarization conversion optical system 20 toward the integrator optical system 30 is light of P polarization. However, even though there is a difference in polarization as to the light emitted, the operation of the polarization conversion optical system 20 in Embodiments 1 and 2 is basically the same.

The invention being thus described, it will be obvious that the same may be varied in many ways. For example, as explained above, the polarization splitting plane of the polarization converter may be arranged so that the P-polarized light is transmitted and the S-polarized light is reflected when performing polarization beam splitting, or a polarization splitting plane may also be used that performs polarization beam splitting by making the S-polarized light the transmitted beam and the P-polarization light the reflected beam. Additionally, various optical systems may separate the three color component light beams, process the beams through various modulating devices, and synthesize the light beams for projection, including optical systems that variously transmit and reflect different color components in order to separate them. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A polarizing illumination optical system comprising, in order:

a light source that includes a parabolic reflector that defines an optical axis and a light emitter arranged at the focal point of said parabolic reflector so that said light source emits from the front of said light source a substantially collimated light beam that travels substantially parallel to said optical axis;

a polarization conversion optical system that receives said substantially collimated light beam and separates the light of said substantially collimated light beam into two light beams that are polarized in different directions, converts the polarization of one of said two light beams into the same polarization as the other of said two light beams, and emits both of said two light beams as two substantially collimated light beams in a direction substantially parallel to said optical axis;

wherein said polarization conversion optical system satisfies the following condition:

$$4f < D < 7f$$

where f is the focal length of said parabolic reflector, and

D is the minimum width of the optical incidence aperture of said polarization conversion optical system; and an integrator optical system that includes at least two integrating plates arranged in optical series that receives said two substantially collimated light beams from said polarization conversion optical system and produces from said two substantially collimated light beams a light beam more uniform in intensity in a cross-section perpendicular to said optical axis than either of said two substantially collimated light beams.

2. The polarizing illumination optical system of claim 1, wherein said polarization conversion optical system is arranged so that the optical axis defined by said parabolic reflector passes substantially through the center of said optical incidence aperture.

3. The polarizing illumination optical system of claim 2, wherein said polarization conversion optical system includes at least one optical element that includes a polarizing beam splitter element with a polarization splitting plane and a polarization rotation optical element that rotates the direction of polarization of light of one light beam from said polarization splitting plane.

4. A projection display device comprising, in order:

the polarizing illumination optical system of claim 3;

at least one light modulator for modulating said light beam more uniform in intensity with image information; and a projection lens for projecting the light beam modulated by said at least one light modulator in order to form an image corresponding to said image information.

5. A projection display device comprising, in order:

the polarizing illumination optical system of claim 2;

at least one light modulator for modulating said light beam more uniform in intensity with image information; and a projection lens for projecting the light beam modulated by said at least one light modulator in order to form an image corresponding to said image information.

6. The projection display device of claim 5, wherein said polarization conversion optical system includes two optical elements, each of which includes a polarizing beam splitter element with a polarization splitting plane and a polarization rotation optical element that rotates the direction of polarization of light of one light beam from said polarization splitting plane.

7. The projection display device of claim 6, wherein said two optical elements, including their polarizing beam splitter elements, their polarization splitting planes, and their polarization rotation optical elements, are symmetrically arranged on opposite sides of said optical axis.

8. The polarizing illumination optical system of claim 2, wherein said polarization conversion optical system includes two optical elements, each of which includes a polarizing beam splitter element with a polarization splitting plane and a polarization rotation optical element that rotates the direction of polarization of light of one light beam from said polarization splitting plane.

9. The polarizing illumination optical system of claim 8, wherein said two optical elements, including their polarizing beam splitter elements, their polarization splitting planes, and their polarization rotation optical elements, are symmetrically arranged on opposite sides of said optical axis.

10. The polarizing illumination optical system of claim 1, wherein said polarization conversion optical system includes at least one optical element that includes a polarizing beam splitter element with a polarization splitting plane and a polarization rotation optical element that rotates the direction of polarization of light of one light beam from said polarization splitting plane.

11. A projection display device comprising, in order:

the polarizing illumination optical system of claim 10;

at least one light modulator for modulating said light beam more uniform in intensity with image information; and a projection lens for projecting the light beam modulated by said at least one light modulator in order to form an image corresponding to said image information.

12. A projection display device comprising, in order:

the polarizing illumination optical system of claim 1;

at least one light modulator for modulating said light beam more uniform in intensity with image information; and a projection lens for projecting the light beam modulated by said at least one light modulator in order to form an image corresponding to said image information.

\* \* \* \* \*

UNITED STATES PATENT AND TRADEMARK OFFICE
CERTIFICATE OF CORRECTION

PATENT NO. : 6,816,206 B2
DATED : November 9, 2004
INVENTOR(S) : Yamamoto

It is certified that error appears in the above-identified patent and that said Letters Patent is hereby corrected as shown below:

Column 5,
Line 36, change "regard FIGS." to -- regard to FIGS. --;

Column 6,
Line 51, change "optical system" to -- optical system 20 --; and

Column 7,
Line 58, change "converting third" to -- converting the third --.

Signed and Sealed this

Twenty-second Day of February, 2005

JON W. DUDAS
*Director of the United States Patent and Trademark Office*